Sept. 17, 1935.   T. W. PRICE   2,014,507
BLOWER FOR FURNACES
Filed Jan. 12, 1931
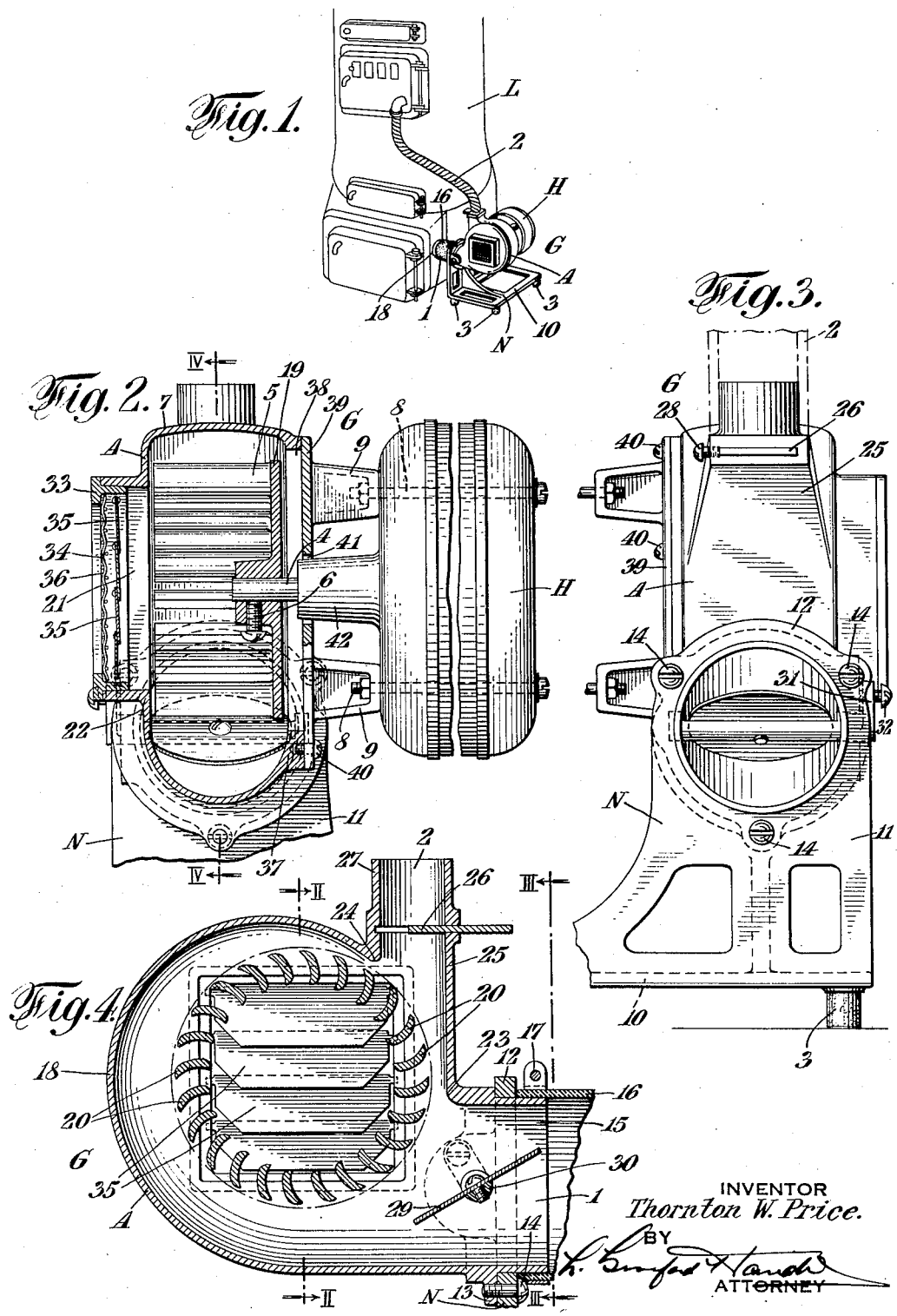
INVENTOR
Thornton W. Price.
BY
ATTORNEY Patented Sept. 17, 1935

2,014,507

UNITED STATES PATENT OFFICE 2,014,507

BLOWER FOR FURNACES

Thornton W. Price, New Brunswick, N. J.

Application January 12, 1931, Serial No. 508,351

3 Claims. (Cl. 230—127)

This invention relates to a blower for furnaces and an object of the invention is to provide a blower including a motor, a fan, a fan housing and a mounting for said parts, all being of substantial construction and the whole being of compact form and of high efficiency in operation.

A further and more detailed object is to so construct the blower that it will deliver two distinctly separate blasts of air for use at different spaced portions of the furnace, each blast being valve controlled; and to so construct the blower that adjustment of the valve controlling one blast will have a minimum of effect upon the other blast.

A further detailed object is to so construct the blower that it will be automatically effective to cut off to a suitable degree the natural draft moving to the furnace through the blower conduits when the blower is still.

A further detailed object is to so construct the blower as to facilitate the easy and convenient assembly and disassembly of the motor and fan housing with respect to each other, and particularly to provide for the assembly and disassembly of these parts while the fan is operatively assembled with the motor.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a perspective view of a blower constructed in accordance with this invention and showing the same as it appears in operative association with a furnace.

Fig. 2 is an enlarged vertical central sectional view through the blower said section being approximately upon the plane of line II—II of Fig. 4.

Fig. 3 is a side elevational view of the fan housing and its support, said view being taken from a plane as indicated by the line III—III of Fig. 4, and Fig. 4 is a vertical sectional view taken upon the plane of line IV—IV of Fig. 2.

Referring to the drawing for describing in detail the structure as illustrated therein, the reference character L indicates an ordinary furnace. The blower with which this invention is concerned is indicated generally by the reference character G and its purpose is to supply air under pressure to the furnace through a pair of conduits as 1 and 2, the conduit 1 supplying air into the ash pit portion of the furnace and the conduit 2 supplying air into the upper portion of the furnace, as for instance through the fire door as indicated.

The conduits 1 and 2 are preferably flexible, and the blower is resiliently mounted as upon rubber feet as 3, so that the sound and vibration of the blower are not transmitted to the furnace.

The blower G consists essentially of a motor element H, a fan element A, and a carrier N.

The motor H is of any approved type, usually electrically driven, and includes a drive shaft 4 projecting into the fan element A.

The fan element A includes a fan as 5 fixed, as by a set screw 6, upon the shaft 4, and a housing 7 for containing said fan. This housing is rigidly fixed to the motor as by means of bolts as 8 which extend through the motor and engage extending lug parts as 9 of the housing.

The support N rests upon the floor of the furnace room and serves to support the motor and fan elements. It may be of any approved construction but in the instance illustrated consists of a main base part 10 having the rubber or otherwise resilient feet 3 and having a standard as 11 rising therefrom and formed with a collar-like portion 12 through which a part of the conduit forming portion 1 of the fan housing projects, the fan housing having a suitable flange 13 for resting against the collar 12, said parts being connected together by suitable fastening means such as the screws or bolts 14, as indicated.

The elements H, A and N are thus rigidly connected together and the element N is so shaped as to dispose its feet 3 in such relation to the centre of gravity of the whole that each of said feet receives its proporionate share of the weight, as will be readily understood.

The portion of the fan housing which engages the collar 10 is preferably cast integral with the main body of the fan housing and includes an annular pipe-like extension 15 which projects through the collar 12 and provides an appropriate sleeve upon which to attach a section of rubber tubing as 16 which is telescoped thereover and which is held by a clamp ring as 17. This rubber tubing 16 continues to the furnace as a part of the conduit 1 and its end adjacent the furnace is connected with a sleeve as 18 which communicates with the interior of the ash pit in the usual manner.

The main body of the fan housing is so shaped, and the housing is so connected with the motor by the bolts 8 and lugs 9 with respect to the axial centre of shaft 4, that the outer annular wall 18 of said housing is disposed to extend in a convolute direction about the outer periphery of the fan and to merge into the tangential conduit 1 in the usual approved manner.

The fan consists of an annular back plate 19 having a central bossed bearing fitting upon the shaft 4 and having the forwardly projecting curved finger-like blades 20—20 adjacent its periphery. These blades define generally a central opening or cavity which is aligned with an air inlet opening 21 provided through the front wall 22 of the housing. Rotation of the fan will suck air inwardly through the opening 21 and drive it in all radial directions outwardly between the fingers 20. The major portion of this air will be driven against the convolute wall 18 and outwardly through the conduit 1. A relatively smaller portion however will be driven through the conduit 2 which it will now be noted also extends tangentially from the fan at an angle to the conduit 1. The conduits 1 and 2 are definitely separated from each other by means of a wall portion as 23 of the fan housing which stands in close proximity to the outer peripheral surface of the fan at a point intermediate the two conduits. The air driven outwardly by the fan and striking the outer wall of the housing between the wall portion 23 and the opposite edge wall portion as 24 of the conduit 2 will be driven directly into said conduit 2.

The fan housing is shown as consisting of an integrally cast tubular extension as 25 constituting a part of the conduit 2, and in this extension there is provided a manually operable valve 26 by which the amount of air allowed to pass along the conduit may be conveniently regulated. The extension 25 has a reduced outer annular end part 27 over which a section of flexible metallic hose may be readily connected in telescoped relation to complete the conduit 2 in the usual manner.

The valve 26 may be of any appropriate type but for simplicity and convenience is herein shown to consist of a simple rectangular plate slidably mounted transversely of the conduit. A set screw 28 is shown as an example of means to hold the valve in any position to which it is manually moved.

The conduit 1 is preferably also provided with a valve as 29 manually operable to control the amount of air moving through said conduit 1. This valve also may take any desired form but for the purpose of simplicity and convenience is here shown as consisting of a simple metallic disc mounted upon a cross rod 30 which extends transversely across the conduit. This cross rod is rotatably mounted in bearings at opposite sides of the conduit and one end of said cross rod is extended through the wall of the conduit and has a lateral extension as 31 by which the rod may be manually rotated at will to determine the position of the disc. A set screw 32 is carried by the extension 31 adjustable to hold the valve in any position to which it is adjusted.

It is noted that the two valves 26 and 29 are both carried by the fan housing in close proximity to the fan and yet each is independently operable and is capable of controlling its respective conduit, the relation of the parts being such that adjustment of either valve will produce little or no effect upon the amount of air moving through the conduit controlled by the other valve. The two conduits are so related to the fan that each receives a blast of air from the fan in substantially the same manner as if the other did not exist.

Arranged within the air inlet opening 21 of the fan housing is an automatic air shutter which is operable to permit an easy inflow of air whenever the fan is rotating but which will exclude the inward movement of any appreciable quantity of air when the fan is still. The purpose of this device is to prevent any appreciable quantity of air from being delivered into the furnace through the fan housing under the pull of the natural furnace draft when the blower is not operating. This shutter may take any approved form but in the instance illustrated is shown to consist of a separately constructed frame 33 mounted snugly within the air inlet opening 21 and held by friction or otherwise. This frame has an inlet opening 34 and within this opening, pivotally mounted upon opposite walls of the frame, is a series of light shutters or flaps as 35—35 which hang by gravity from their pivotal supports and normally rest against each other as indicated in Fig. 2. When the fan is still these flaps therefore serve to close the opening 34 but when the fan is in operation the suction created thereby is sufficient to readily swing the flaps about their pivotal supports and into a suitably wide open position for plentifully admitting air to the fan. As soon as the fan has again stopped the flaps again drop to closed position.

If desired a screen as 36 may be carried within the frame 33 in front of the shutter flaps suitable to protect said flaps from injury.

The rear wall as 37 of the fan housing is formed with a large opening 38 therethrough normally closed by a separately formed cover plate 39, said plate being held rigidly connected with the housing by suitable fastening means such as the screws or bolts 40 so that it is in fact a part of said housing. The lugs 9 by which the housing is connected with the motor are preferably formed upon this plate, and the plate has a central opening as 41 through which the motor fan 4 enters the housing.

As illustrated, an extended bearing 42 of the motor projects through the opening 41 and practically fills said opening so that very little air may enter the fan housing at this locality.

The opening 38 of the rear wall of the fan housing is sufficiently large to admit of easy movement of the fan therethrough into and out of the housing during the process of assembling or disassembling the blower, and this is an important consideration in that it provides an easy and convenient arrangement affording access to all parts of the blower for cleaning and repairing. By removal of the fastening devices 40 the motor and with it the back plate 39 and the fan may be bodily lifted away from the fan housing for the making of repairs or otherwise. Meanwhile the large opening 38 in the rear wall of the fan housing is left open for unobstructed access into the interior of the fan housing for cleaning etc. When the cleaning and repairing has been completed the motor and fan may be again brought together, the fan being inserted into the housing through the opening 38 and the fastening devices 40 again placed in holding position, the whole operation having been performed with ease and simplicity and without necessity for the slightest derangement of the relationship between the fan housing and the furnace.

When the parts are in their assembled condition the weight of the motor is supported directly by the fan housing and through said fan housing to the standard 11 of the carrier N. By reason of the fact that the carrier N extends from a point below its point of attachment with the fan housing to a point below the motor, so as to provide for a proper distribution of weights upon the several feet 3 of the carrier, it will be apparent that the entire structure is in the form roughly of a U disposed horizontally with one of its legs resting upon the floor and its opposite leg, represented by the motor and fan elements, spaced above the first leg, so that the whole structure is under considerable stress due particularly to the supported weight of the motor in the relation as indicated. All joints and other parts are thus suitably strained to reduce the tendency of the various parts to move or loosen with respect to each other. The inherent hum of the various metallic parts and connections during operation of the motor is dampened and subdued so that the apparatus is made to operate with a minimum production of sound.

As many changes could be made in this construction without departing from the scope of the invention as defined in the following claims, it is intended that all matter contained in the above description, or shown in the accompanying drawing, shall be interpreted as illstrative only and not in a limiting sense.

Having thus described my invention, what I claim as new and desire to secure by Letters Patent is:

1. A blower consisting of a motor element, a fan element, and a carrier by which said motor and fan elements are supported, the fan element comprising a fan housing and a fan therein, the motor element being arranged horizontally at one side of the fan housing and consisting of an electric motor having its drive shaft extending horizontally into the fan housing and connected for driving said fan, means whereby the motor element is supported wholly upon the fan housing, the fan housing being formed with a tubular extension projecting tangentially of the fan, and the carrier having a part engaging about said extension, and fixed thereto, constituting the sole means of connection between the carrier and the motor and fan elements.

2. A blower consisting of a motor element, a fan element, and a carrier, said elements being connected together in the general form of a horizontally disposed U, the carrier constituting one leg of said U and adapted to rest upon a support, and the motor and fan elements constituting the other leg of the U and being supported above the first leg by the connecting portion of the U.

3. A blower consisting of a motor element, a fan element, and a carrier, said elements being connected together in the general form of a horizontally disposed U, the carrier constituting one leg of said U and adapted to rest upon a support, the motor and fan elements constituting the other leg of the U and being supported above the first leg by the connecting portion of the U, the fan element being positioned relatively near to the connecting portion of the U and having a part directly fixed to a part of the carrier to constitute the connecting portion of the U, and the motor element being positioned relatively further from the connecting portion of the U and being supported solely by its connection with the fan element.

THORNTON W. PRICE.